United States Patent [19]

Ege

[11] 4,427,033
[45] Jan. 24, 1984

[54] BENDING STRAIN RELIEF WITH ADJUSTABLE STIFFNESS

[75] Inventor: Sigmund Ege, Oslo, Norway

[73] Assignee: International Standard Electric Corporation, New York, N.Y.

[21] Appl. No.: 331,093

[22] Filed: Dec. 15, 1981

[30] Foreign Application Priority Data

Dec. 22, 1980 [NO] Norway .................................. 803895

[51] Int. Cl.³ ............................................. F16L 11/12
[52] U.S. Cl. ..................... 138/103; 138/125; 138/127; 138/130; 138/153; 138/172; 138/174; 138/178
[58] Field of Search ............ 138/103, 104, 111, 118.1, 138/121, 122, 124, 125, 129, 126, 130, 127, 153, 172, 173, 174, 177, 178, 137, 140, 93; 174/70 S, 70 C, 99 E, 102 R, 102 D; 3/1.2, 1

[56] References Cited

U.S. PATENT DOCUMENTS

| 301,417 | 7/1884 | Wilkinson | 138/124 |
| 746,319 | 12/1903 | Frees | 138/124 |
| 834,074 | 10/1906 | Patterson | 138/124 |
| 3,420,276 | 1/1969 | Skinner et al. | 138/177 |
| 3,831,636 | 8/1974 | Bittner | 138/122 |
| 3,886,980 | 6/1975 | Elson | 138/153 |
| 4,000,759 | 1/1977 | Higbee | 138/103 |

Primary Examiner—William D. Martin, Jr.
Attorney, Agent, or Firm—John T. O'Halloran; Alfred C. Hill

[57] ABSTRACT

The present invention relates to a bending strain relief device with adjustable stiffness to be used in connection with cables or pipes. The stiffness of the device is made adjustable by having an expandable body arranged between the cable or pipe and a stiffening rod arrangement. When inflated, the expandable body causes increased friction between the stiffening rod layers and the relief may be locked in any desired position.

11 Claims, 7 Drawing Figures

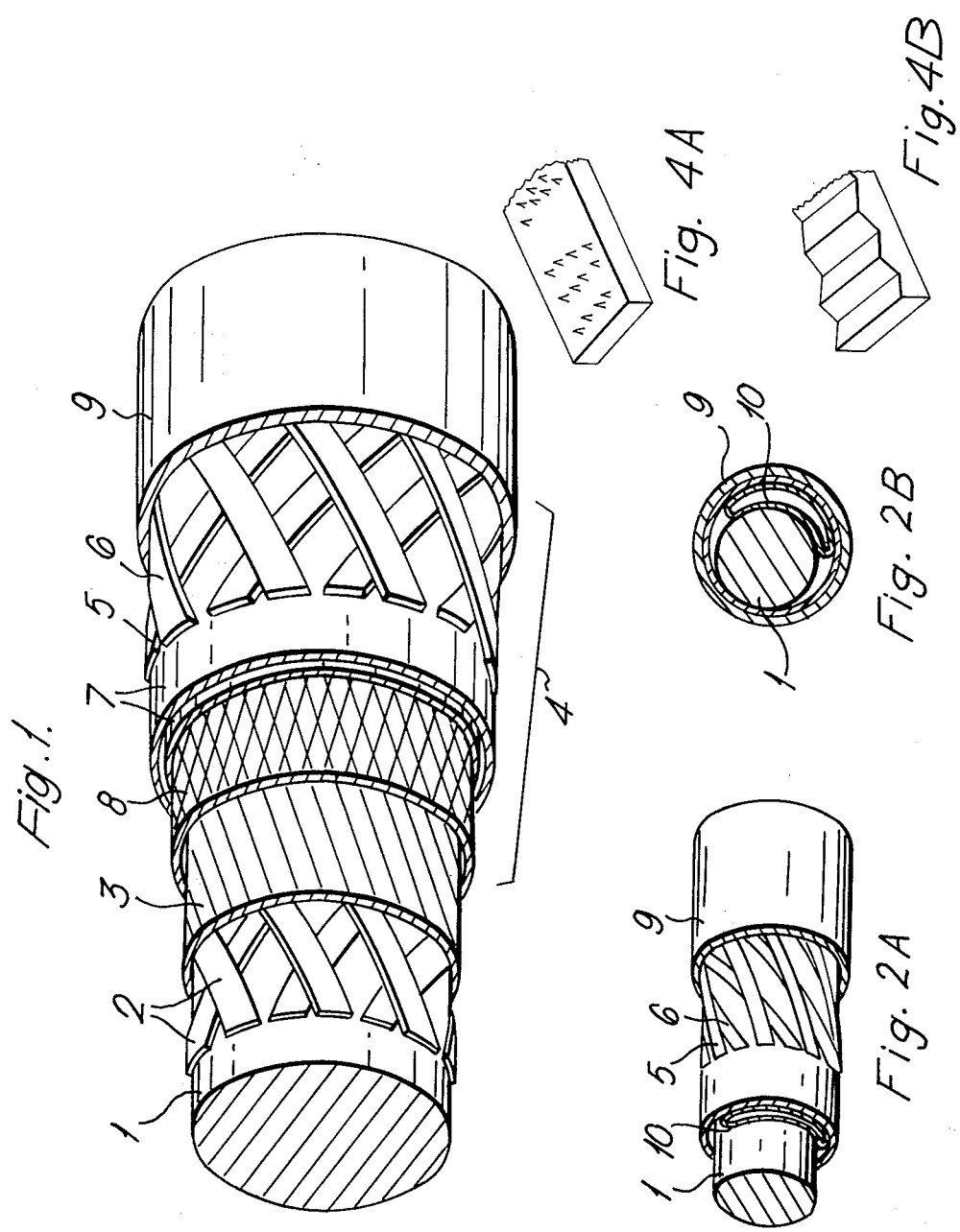

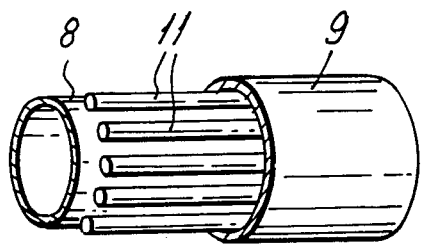
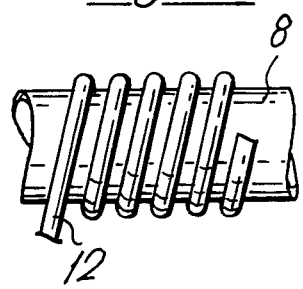
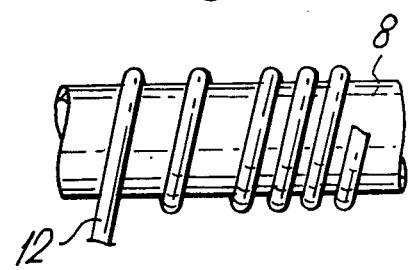
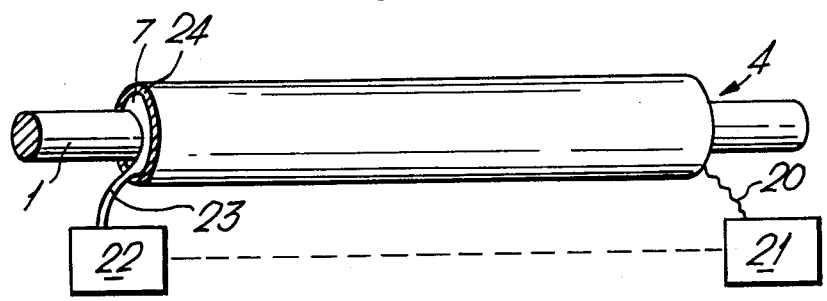

BENDING STRAIN RELIEF WITH ADJUSTABLE STIFFNESS

FIELD OF THE INVENTION

Submarine cables are designed to withstand the strains caused by bending under tension during the laying operation, but they are normally not designed to stand repeated flexing during normal operation.

In those cases where the cable, or part of it, will be subject to constant flexing, such as for cables feeding power to, or from floating platforms, it is normal practice to install bending strain reliefs in order to limit the amount of bending each unit length of the cable is subjected to. Such strain reliefs can be made in many ways, but one common characteristic is that they are so designed, that the combined stiffness of the cable itself and the strain relief is gradually reduced from the point on where the cable is clamped in a fixed position. A typical example of such a bending strain relief is one which is marketed under the trade name Everflex and made by Preformed Line Products of Cleveland, Ohio. This strain relief consists of a moulded structure reinforced with helically formed stiffening rods of steel.

To be effective, such a bending strain relief must be tailor-made for a particular cable and for a given pattern of bending strains. For this reason they are not too well suited for installations where the bending pattern changes with time. In the case of cables used to bring electric power ashore from floating platforms (where electricity is generated using natural gas as the energy source, or the difference in water temperature (OTEC)), the cable may for long periods only be subjected to a minor degree of bending, although the number of cycles will be extremely large. The cable must at times, for instance when wind and current change, in addition withstand one or a small number of much larger degrees of bending strains, whereafter the strain is reduced considerably, and the number of cycles is increased again.

A steel tube, with the wall thickness tapering off, would be an excellent bending strain relief for bending angles so small that the elastic limit of the steel is not exceeded. Such a solution would, however, be entirely impractical for the small number of large-angle deflections. Such bendings would invariably cause the steel pipe to buckle.

It is the object of the present invention to avoid the limitations of the known bending strain reliefs, by making the stiffness of the relief variable. The stiffness should be set at a vary high value when the bending angles are so small that there is no danger of buckling, even with such high stiffness, and it should be reduced to take care of a smaller number of larger deflections, which otherwise would cause buckling of the relief.

The invention will be particularly useful for submarine cables made with an insulation consisting of paper applied as strips wound helically around the conductor and impregnated with oil, and with a sheath of lead or of a lead alloy. Such cables can, when equipped with a suitable armor, take considerable bending, as it must do when stored between the various manufacturing processes as well as during laying, but it is susceptible to developing soft spots in the insulation and cracks in the lead sheath if it is exposed to a large number of bends, even if these are of only moderate amplitudes.

If such cables are to be connected to floating platforms, it is imperative that the strain in the lead sheath is maintained at a very low value if the number of bending cycles is large, while it will tolerate cycles of very large strains if these happen only occasionally.

Even a shore-to-shore submarine cable may be subjected to repeated bending, namely, if it has to be repaired, and the cable stays suspended from the repair ship for a considerable period of time. In the case of a high voltage DC or AC cable of the above-mentioned paper-lead type, the repair may take as long as one week. While suspended from the ship's bow sheave, the cable is subjected to the highest strain at the point where it leaves the bow sheave. It would then be advantageous to have the strain relief extend well below the splash zone so that also movements by waves acting on the cable may be prevented from causing local bending in addition to the bending caused by the ship's movement. In this case an adjustable stiffness of the bending relief is a must, since it would otherwise be difficult to pass it over the bow sheave. Once the cable is in position for repair, the stiffness could be set at a maximum value, only to be reduced temporarily in case the wind or current should shift and it should be desirable to turn the repair ship accordingly.

SUMMARY OF THE INVENTION

The main feature of the present invention is defined in the accompanying claims. The stiffness of the assembly is increased simply by inflating an expandable body, such as a rubber hose, so that it will create a pressure both on the armor of the cable and on the stiffening rods of the strain relief. The effect on the cable will be greater if it has a double layer of armor wire and these are applied counter-helically. When the pressure in the hose is increased, the two layers of armor will tend to lock against each other, thereby increasing the stiffness of the cable. Most of the increased stiffness will, however, come from the strain relief itself, both because the stiffening rods, which also may be applied counter-helically, are larger in cross-section and they may be made from higher strength steel, and because they are located at a greater distance from the cable axis. To increase the effect of inflating the hose further, the stiffening rods in the strain relief are, according to one embodiment of the invention, intentionally made with a rough surface, so that the wires have a greater tendency to lock against those of the next layer. The various layers of steel rods will in fact act much in the same manner as a steel tube would, at least for the smallest bending angles. For a strain relief using this embodiment, it will be particularly desirable to reduce the pressure in the rubber hose before the large-angle bending starts, since otherwise the uneven surface of the stiffening rods would soon wear smooth.

According to another embodiment of the invention, which will be particularly useful during the above-mentioned repair procedure, the double walled rubber hose is replaced by a smaller diameter hose which is wrapped helically around the cable prior to sliding the bending relief assembly in place. The large clearance which thereby may be allowed between the cable and the strain relief will be particularly useful when guiding the cable end through the relief (prior to the splicing operation). One other, additional advantage of this embodiment is that the helix, with which the rubber hose is wrapped around the cable, could be made to open more and more towards the two ends, which means that the locking effect on the cable relief will gradually be smaller towards the ends. Finally, it could also be used in conjunction with a split-type strain relief.

The adjustment of the cable bending relief stiffness may be manual, based on navigational inputs from the cable repair ship or the floating platform. According to one embodiment of the invention this adjustment is made automatic and initiated by sensors built into the cable bending strain relief itself. It will act in such a way that the pressure in the rubber hose is reduced according to a preset program when the bending strain exceeds a predetermined level. As long as the strain increases the pressure is left off but when the increase within a preset time interval has fallen to a predetermined value, pressure is re-applied. The above procedure corresponds to a shifting of a platform or ship. If the high strain is caused by a cyclic bending, an alarm should be sounded to indicate the desireability of manual takeover.

The present invention could be used to advantage in connection with the concept covered by Norwegian Pat. No. 138,973, corresponding to U.S. Pat. No. 4,257,717, which is also aimed at distributing bending of cable as evenly as possible. According to that patent this is achieved by clamping the cable at certain intervals and arranging for any movement of these clamps to be coordinated in such a manner that a minimum strain, per unit length is obtained. By introducing cable strain reliefs according to the present invention at each clamping point, an even better control of the movement of the cable may be realized than if the concept of the above-identified patent is being used alone.

The invention may also be used to advantage in combination with the buoyancy device covered by U.S. Pat. No. 4,048,686. One suggested use of this buoyancy device is to help relieve the tension in a cable during a cable repair such as the one described above. By relieving, say 75%, of the tension in the cable, the danger of having localized high strains in the cable where it leaves the bow sheave would be reduced considerably. The point at which the buoyancy devices are attached to the cable could, however, cause local sharp bending which again could be reduced by the use of a cable strain relief according to the present invention. In those cases where the cable forms a fairly small angle with the horizontal plane at the point where the buoyancy device is attached, the cable strain relief may even constitute a means of attaching the buoyancy device to the cable, namely, in the case where the friction between the cable surface and the rubber hose is sufficient to prevent the cable strain relief from sliding along the cable, when the rubber hose is inflated.

Finally, a somewhat special application of the invention would be one where the cable is installed in a "J"-tube, an installation method which is quite common in offshore platforms of the type which is resting on the ocean floor. This tube has, however, an inner diameter which is substantially larger than the outer diameter of the cable. The "J"-tube itself would be an excellent cable strain relief, if one could be sure that the cable would bend with the steel tube. Unfortunately this may not be the case, especially not at the bottom of the "J"-tube, where the tube and the cable would normally be buried in the ocean bed. In this case the invention may be used both to increase the stiffness of the cable and to assure that whatever bending is taking place follows the bending of the tube itself. To obtain this the cable strain relief is according to one embodiment of the invention provided with an expandable rubber hose also outside the strain relief.

According to still another embodiment of the invention, the stiffness of the strain relief is made permanent by inflating the rubber hose with a fluid which, after some time, hardens. This could, for instance, be accomplished by filling the hose with an epoxy resin and with a hardner added just prior to it being pumped into the hose, but any known fluid which hardens may be used.

To improve the stiffening effect further, a hardening compound could also be pumped in between the stiffening rods of the strain relief so as to completely lock the wires, thus forming a structure in which the rods may be considered to act as armoring rods.

This latter version of the expandable bending strain relief will be particularly useful for a cable to be laid in an area where the ocean bed is such that one cannot guarantee that the cable will be in contact with the bed throughout its entire length. If the span is very short, one could consider stiffening the whole free span, but even if the span is long it would be very desirable to at least stiffen the cable at both ends of the catenary.

BRIEF DESCRIPTION OF THE DRAWINGS

Above-mentioned and other features and objects of the present invention will clearly appear from the following detailed description of several embodiments of the invention, where FIG. 1 schematically shows one embodiment of the invention, FIGS. 2A-E illustrate various ways of making expandable bodies, FIG. 3 schematically shows the arrangement of a bending strain relief device in accordance with the present invention placed on a cable or pipe, and FIGS. 4A and 4B schematically illustrate on an enlarged scale corrugations and/or roughened engagement surfaces of the stiffening rods.

DETAILED DESCRIPTION OF THE INVENTION

In FIG. 1 is illustrated a cable core 1 provided with counter-helically applied armor 2 of conventional type either consisting of flat elements as shown or round wires. Over the armor 2 there is usually placed one or more protective covers 3. The cable construction is, however, of minor importance because any type of cable or pipe may be used in connection with the present invention.

The strain relief device 4 is constituted by at least two sets of stiffening rods 5 and 6 as well as an expandable body 7. These may be arranged on an inner flexible stabilizing sheath 8 or the like underneath the expandable body 7, and there should be placed an outer sheath 9 or the like over the stiffening rods 5, 6. This outer sheath 9 should be made to have bending flexibility to substantially the same degree as that of the cable 1, 2, 3, or pipe, and it should be capable of withstanding radial forces exerted by the expandable body 7. When the expandable or inflatable body 7 is inflated by pressurized gas or fluid, it will create a pressure on the stiffening rods 5, 6 (and also on the armoring layers 2). As the pressure is increased, the stiffening rods 5, 6 will be pressed together to increase the friction between the two rod sets 5,6, until finally the strain relief 4 is locked in a fixed position. The pressure exerted by the expandable body 7 will also result in increased friction between the armoring layers 2 so that the stiffness of the cable itself may also be varied somewhat.

The outer sheath 9 should be made from steel or metal tapes wound with a short length of lay to provide the bending flexibility and these tapes could be embedded in a sheath of rubber or plastics possibly together with steel tapes with relatively long length of lay to provide the strain relief 4 with the sufficient longitudinal strength.

The bending strain relief structure 4 could be made as an integrated unit being built up from an inner stabilizing sheath 8 as mentioned, having an inner diameter larger than the outer diameter of the cable 1, 2, 3 or pipe.

In order to increase the friction between the stiffening rod layers 5, 6 and obtain the desired adjustable stiffness of the strain relief 4, the stiffening rods 5, 6 may be provided with irregular corrugations on the contacting surfaces so that the stiffening rod layers (two or more) may be locked in any desired position.

In FIG. 1 the stiffening rods 5, 6 are shown wound with opposite directions of lay. Alternatively the stiffening rod layers 5, 6 may be wound with the same direction of lay but with different length of lay. As long as the rod layers 5, 6 cross each other within a reasonable distance, say within 50 cm, the adjustable stiffness may be obtained. This alternative is illustrated in FIG. 2A.

The expandable body 7 is in FIG. 1 illustrated in the form of a double walled hose. An alternative embodiment is illustrated in FIG. 2B where the expandable body 7 is constituted by a single hose 10 which, when inflated, will provide increased friction and at least partial interlocking of the stiffening rods if so required.

FIG. 2C illustrates that the expandable body 7 is constituted by a number of hoses 11 which may be inflated individually or as one unit if the hoses 11 are interconnected. These hoses 11 may be placed in parallel with the strain relief axis or wound helically, in both cases preferably with an inner flexible stabilizing sheath 8 as base for the hose arrangement.

FIG. 2D illusrates how one hose 12 may be wound helically to provide the expandable body 7, and FIG. 2E shows how the hose 12 may be wound with variable length of lay to provide greater flexibility in certain parts of the bending strain relief 4. Reduced stiffness and greater flexibility may in some instances be desirable at the ends of the device.

FIG. 3 schematically illustrates a bending strain relief device 4 arranged on a cable 1, 2, 3 or pipe at a place where the bending strain on the cable or pipe has to be controlled. Bending strain sensors (not shown) having leads 20 may be placed on the cable 1, 2, 3 or pipe or within the relief 4 itself to provide a control box 21 with information signals so that a compressor or gas cylinder valve 22 may be energized manually or automatically to provide the necessary fluid or gas pressure for the expandable body 7, a fluid/gas inlet 23 being indicated.

In some cases it may be convenient to apply the bending strain relief structure 4 in two steps, first applying the inner expandable part 7 and thereafter sliding the outer structure 24 including the stiffening rods 5, 6 and outer sheath 9 over the body 7. Such procedure will simplify detachment of the body 7 after use, in particular if this body is of the type indicated in FIG. 2. In addition the outer structure 5, 6 may be of some conventional hinged or split interlocked type to allow full detachment after use.

I claim:

1. A bending strain relief device having two operating modes, a first of said two modes rendering said device relatively stiff and a second of said two modes rendering said device relatively flexible for use with a conduit, said device including first and second sets of helically formed stiffening rods, said first set of rods surrounding said conduit and said second set of rods surrounding said first set of rods said rods of said first set of rods lightly engaging said rods of said second sets of rods;

an outer sheath surrounding and engaging said second set of rods;

at least one expandable body arranged between said conduit and said first set of rods and urging said rods of said first and second sets of rods into greater engagement with one another upon an increased expansion thereof; and operating mode control means having pressure control means coupled to said expandable body to control expansion of and internal pressure of said expandable body to provide said two operating modes.

2. A device as claimed in claim 1, wherein said first set of rods is wound with opposite direction of lay from said second set of rods.

3. A device as claimed in claim 2, wherein said rods have rough engagement surfaces so as to increase the friction between the first and second sets of rods.

4. A device as claimed in claim 3, wherein said engagement surfaces are provided with corrugations.

5. A device as claimed in claim 4, wherein the corrugations are arranged in an irregular pattern so that upon expansion of the expandable body the corrugations of the said rods interlock in any instantaneous position of the device.

6. A bending strain relief device for use in stiffening a conduit, comprising first and second sets of helically formed stiffening rods, said first and second sets surrounding said conduit, and at least one expandable body between said conduit and said stiffening rods, including a double walled hose which may be expanded by inflation with a fluid.

7. A device as claimed in claim 1, wherein said expandable body comprises at least one flexible hose wound helically within said bending strain relief device.

8. A bending strain relief device for use in stiffening of conduits, comprising first and second sets of helically formed stiffening rods, said first and second sets surrounding said conduit, and at least one expandable body between said conduit and said stiffening rods, including at least one flexible hose wound helically within the bending strain relief device, the flexible hose being wound with longer length of lay near the end of the device than in the rest of the device.

9. A device as claimed in claim 1, wherein said rods and said expandable body are made in separate parts.

10. A device as claimed in claim 1, further comprising pressure sensing means operative for sensing external strain applied to the device and connected to the external pressure control means so as to control the pressure in said inflatable hose in dependence on the sensed external strain.

11. A bending strain relief device for use in stiffening a conduit, such as electrical power cables, said device including first and second sets of helically formed stiffening rods surrounding said conduit, an outer bendable sheath surrounding said rod sets and engaging the outer set of said rod sets, at least one inflatable hose disposed between and in engagement with said conduit and the inner set of said rod sets, and external pressure control means coupled to said inflatable hose for continuously maintaining a desired inflation and internal pressure in said inflatable hose thereby continuously ensuring a desired controllable degree of stiffness of said strain relief device.

* * * * *